United States Patent
Ray

(10) Patent No.: US 9,444,921 B2
(45) Date of Patent: Sep. 13, 2016

(54) SYSTEM TO PROVIDE REAL LOOPS FOR SIDETONE MEASUREMENT WITH ANALOG TELEPHONES

(75) Inventor: Amar Nath Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1709 days.

(21) Appl. No.: 11/978,341

(22) Filed: Oct. 29, 2007

(65) Prior Publication Data

US 2009/0110184 A1    Apr. 30, 2009

(51) Int. Cl.
*H04M 1/24*    (2006.01)
*H04M 3/30*    (2006.01)

(52) U.S. Cl.
CPC .............. *H04M 1/24* (2013.01); *H04M 3/305* (2013.01)

(58) Field of Classification Search
USPC .......................... 324/601, 654, 662, 716, 663
See application file for complete search history.

(56) References Cited

U.S. PATENT DOCUMENTS

| | | | | |
|---|---|---|---|---|
| 1,625,503 A | * | 4/1927 | Schooley .................... | 242/125.2 |
| 2,442,366 A | * | 6/1948 | Leno et al. .................. | 174/73.1 |
| 3,357,023 A | * | 12/1967 | Hemmie ....................... | 343/821 |
| 3,594,635 A | * | 7/1971 | Minamii et al. ............. | 324/541 |
| 3,763,306 A | * | 10/1973 | Marshall ...................... | 174/115 |
| 3,818,329 A | * | 6/1974 | Reaves, Jr. ........... | G01R 31/021 |
| | | | | 324/540 |
| 4,794,339 A | * | 12/1988 | LeNir et al. ................. | 324/540 |
| 4,928,066 A | * | 5/1990 | Adlon et al. ................. | 324/539 |
| 5,227,720 A | * | 7/1993 | Gross et al. ................. | 324/235 |
| 5,296,823 A | * | 3/1994 | Dietrich ......................... | 333/26 |
| 5,543,718 A | * | 8/1996 | Normile et al. ............. | 324/539 |
| 6,194,663 B1 | * | 2/2001 | Friesen .................. | H01B 11/02 |
| | | | | 174/110 R |
| 6,389,111 B1 | * | 5/2002 | Hollier et al. .................. | 379/28 |
| 6,907,363 B1 | * | 6/2005 | Wyant et al. ................... | 702/65 |
| 7,068,043 B1 | * | 6/2006 | Lo et al. ....................... | 324/533 |
| 7,170,008 B2 | * | 1/2007 | Victor .................... | H01B 11/12 |
| | | | | 174/110 R |
| 2006/0202703 A1 | * | 9/2006 | Shu ............................. | 324/539 |
| 2007/0096750 A1 | * | 5/2007 | Schwarz et al. ............. | 324/648 |

OTHER PUBLICATIONS

Scott, T.R., "Ageing Tests on Solid-Type Cables", Feb. 13, 1939, pp. 67-89.*
Garber, M., "Critical Current Measurements of Isabelle Superconducting cables", Dec. 3, 1982.*

* cited by examiner

*Primary Examiner* — Fan Tsang
*Assistant Examiner* — Jeffrey Lytle
(74) *Attorney, Agent, or Firm* — Swanson & Bratschun, L.L.C.

(57) ABSTRACT

A real loop and method for using the loop for testing sidetone signal level are provided. The loop is modeled from a coil of cable to represent a straight wire loop. Several conducting wires in a cable may be used. The cable may be configured in a coil and may have a first end and a second end exposed for electrical connections to an even number of wires. Each wire in the even number of wires may be capable of being identified as the same wire on each of the first and second ends of the cable. One or more pairs of wires in the even number of wires may be electrically connected to form an electrical loop. An electrical current passes in opposite directions in the wires in each pair of wires.

8 Claims, 2 Drawing Sheets

PRIOR ART

FIGURE 3   FIGURE 3B

SYSTEM TO PROVIDE REAL LOOPS FOR SIDETONE MEASUREMENT WITH ANALOG TELEPHONES

BACKGROUND

1. Field of the Invention

The principles of the present invention relate generally to an improved telecommunication system, and in particular, to an improved method of testing a communication device. Still more particularly, the principles of the present invention relate to a method and apparatus for creating a real loop for measuring sidetone levels in communication devices.

2. Description of the Related Art

Several electrical circuits operate over large distances. For example, telephone networks, such as public switched telephone network (PSTN), connect telephone devices to the telephone network infrastructure components over several hundred or thousand feet. A typical analog phone is connected to a central office (CO), a location in the telephone network that houses telephone equipment, and provides telecommunication services using the analog phone. Typically, the distance between the telephone device and the CO is of the order of several thousand feet. An electrical cable spans that distance to electrically connect the telephone device to the CO via a number of intermediate devices. Two wires of the electrical cable, one considered running from the telephone device to the CO, and the other considered running from the CO to the telephone device, form a loop. A loop is an electrically conductive path starting from a telephone device, passing through the CO, and terminating at the same telephone device.

In most telephone conversations, a telephone device sends or receives three types of signals. First, a transmit signal which is an electrical signal corresponding to the voice of a user speaking into the microphone of the telephone device. Second, a receive signal which is an electrical signal corresponding to the voice the user hears via the speaker of the telephone device. Finally, a sidetone signal, which is an electrical signal corresponding to the user's own voice picked up by the telephone's microphone, that is fed back to the telephone's speaker via the CO to enable the user to know that the phone is working.

Sidetone is produced by the transmit signal and provides the user a confirmation of the speech level, or pitch, and quality of the transmitted signal. Strength of the sidetone signal is used in maintaining the quality of the call. For example, if the sidetone signal strength is zero, a user might get an impression that the telephone connection is non-functional. If the sidetone signal strength is below a certain threshold level, the user might think that the other user may not be able to hear the user's voice loud enough and consequently speak loudly. If the sidetone signal strength is higher than the threshold, the user might think that the user is talking too loudly and consequently might talk too softly for the other user to be able to hear. Sidetone signals of higher than certain threshold signal strength can also cause ambient noise to be picked up together with the user's voice, thereby making for a noisy connection.

Presently, a telephone equipment is tested for the telephone equipment's response to the sidetone signal of various strengths. In order to simulate the distance the sidetone signal travels—from he telephone equipment's microphone, to the CO, to the telephone equipment's speaker—the test uses a simulation circuit that includes resistors, capacitors, and inductors to simulate the impedance of the length of the wire covering that distance. The sidetone signal strength varies as the distance between the telephone equipment and the CO changes. The tests vary the impedance of the simulation circuit to simulate the various distances. However, the simulation circuits may not realistically reflect the characteristics of an actual length of wire traversing the distance to and from the CO. Consequently, the sidetone signal strength tests using the simulation circuit may not adequately reflect the telephone equipment's response to an actual sidetone signal.

SUMMARY

In order to provide a realistic simulation of a loop for sidetone, the illustrative embodiments provide a loop and a method for using the loop for testing sidetone signal level. A loop is modeled from a coil of cable to represent a straight wire loop. Several conducting wires in a cable may be used. The cable may be configured in a coil and may have a first end and a second end exposed for electrical connections to an even number of wires. Each wire in the even number of wires may be capable of being identified as the same wire on each of the first and second ends of the cable. One or more pairs of wires in the even number of wires may be electrically connected to form an electrical loop.

Passing an electrical current through the loop may result in a direction of the electrical current in one wire in each of the one or more pairs of wires that is opposite of the direction of the electric current in the other wire in those pairs. An impedance of the loop is representative of an impedance of an electrical loop existing between a telephone and a central office in a telephone network.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 3 depicts a spool of electrical cable that may be used for implementing an illustrative embodiment;

FIG. 3B depicts a second exemplary configuration of multiple strands in a cable that may be used for implementing an illustrative embodiment;

DETAILED DESCRIPTION OF THE DRAWINGS

Evaluation of sidetone signal levels is a part of evaluating the acoustic qualities of a telephone device. Evaluation of the sidetone signal levels uses a simulation of the electrical characteristics of the cable connecting the telephone device to the CO. Using the simulation of the electrical characteristics of the cable, testers determine whether the telephone device performs acceptably at the expected sidetone signal strengths at various lengths of that cable. The electrical characteristics of the cable forming the loop include the impedance of the loop. Impedance of the loop includes the resistance, the inductance and the capacitance of the loop.

For example, a test may simulate the electrical characteristics of an 8000 feet (8 Kilo Feet, or 8 Kft) long loop carrying a sidetone signal of a predetermined strength and determine the performance characteristics of the telephone device being tested. The tests are usually run for various lengths of the loop as specified in the telecommunication industry association/electronic industries alliance (TIA/EIA) specifications.

However, it is recognized that a simulated loop of a given length, that is, using simulated electrical characteristics of a loop of the given length, may not provide a realistic approximation of the electrical characteristics of the actual loop of that length, as may exist between a real telephone device and a real CO. Consequently, a telephone device satisfactorily tested with simulated loops may perform unsatisfactorily in actual use.

Therefore, a real loop for testing sidetone signal levels will be useful in providing a more realistic approximation of the actual loop as compared to a simulated loop. A real loop is an actual loop of the designated length of wire. The illustrative embodiments further recognize, however, that using a real loop using electrical cable several thousand feet long may be problematic for space and weight of such a set up. The illustrative embodiments provide a method of forming a real loop that may be manageable for space and weight, and may be used for a variety of purposes including testing for sidetone signals.

Figure 1:
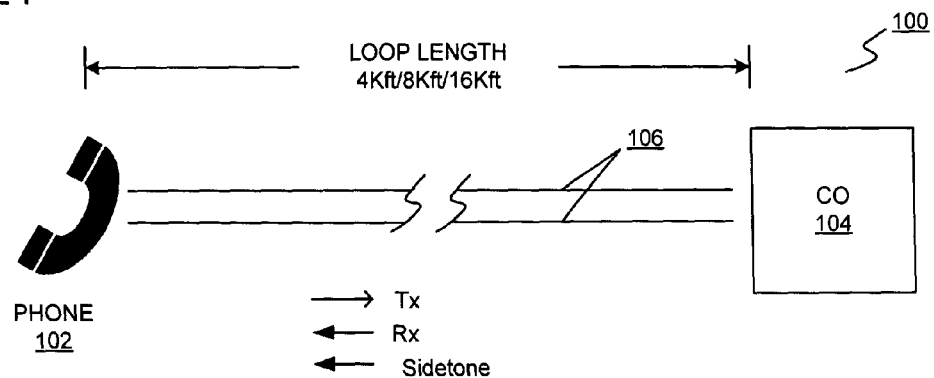
FIG. 1 depicts a presently used telecommunication environment in which the illustrative embodiments may be implemented.

With reference to FIG. 1, this figure depicts a presently used telecommunication environment in which the illustrative embodiments may be implemented. Telecommunication environment 100 includes phone 102 that is electrically connected to CO 104 via a pair of electrical cables or a pair of electrical wires in an electrical cable, which together form loop 106.

Transmit signals (Tx) pass from phone 102 to CO 104. Receive signals (Rx) pass from CO 104 to phone 102, as do the sidetone signals. The distance between phone 102 and CO 104 may be rounded up to the nearest hundred or thousand feet, such that the length of loop 106 is twice the distance.

FIG. 1 depicts the loop length to be 4 Kft, or 8 Kft, or 16 Kft when phone 102 is situated 2 Kft, or 4 Kft, or 8 Kft from CO 104. However, the depicted lengths are only some examples of loop lengths specified in the TIA/EIA specifications, and are not limiting on the illustrative embodiments. In one embodiment, loop 106 may be of any even length. For example, loop 106 may be of 1200 ft, 2456 ft, 9 Kft, 15 Kft, or any other even number of feet in length.

Figure 2:
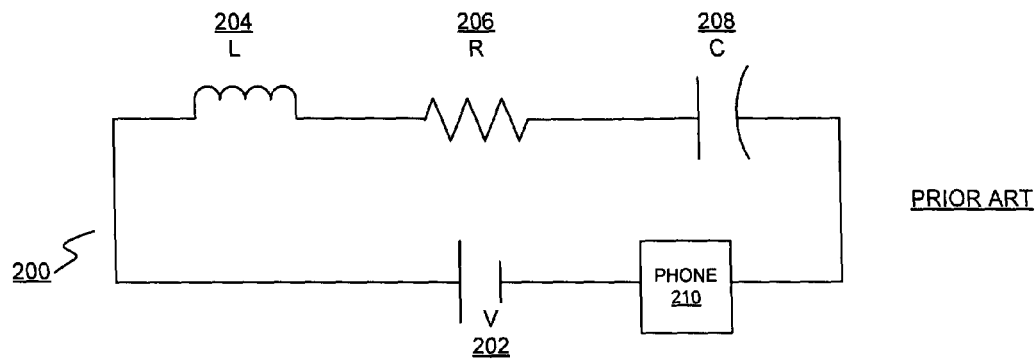
FIG. 2 depicts a presently used simulated loop.

With reference to FIG. 2, this figure depicts a presently used simulated loop. Simulated loop 200 includes power source 202, which is depicted as a 48 Volts direct current power supply. The impedance of simulated loop 200 includes inductor 204, resistor 206 and capacitor 208. Phone 210 may be a telephone device that may be tested using the simulated set up of FIG. 2.

Figure 3A:
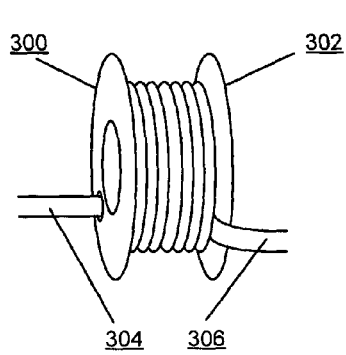
FIG. 3A depicts an exemplary configuration of multiple strands in a cable that may be used for implementing an illustrative embodiment.
Figure 3A:
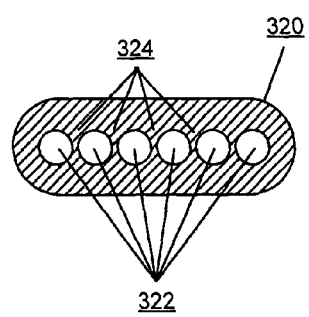
Figure 3A:
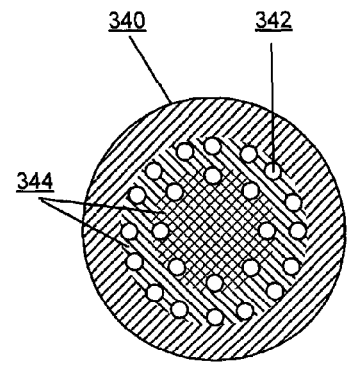

With reference to FIG. 3, this figure depicts a spool of electrical cable that may be used for implementing an illustrative embodiment. Spool 300 may be a spool or a reel for winding electrical cable 302 thereon. Cable 302 has ends 304 and 306, both ends being exposed from spool 300.

Note that the shape and form of spool 300 as depicted in FIG. 3 is only exemplary and not limiting on the illustrative embodiments. Spool 300 is a common method of storing lengths of electrical cable so that the cable may be stored in a smaller space than would be needed if the cable were stretched out in the cable's entire length. Other forms and structures for storing a length of electrical cable may be used in place of spool 300 for implementing the illustrative embodiments. Furthermore, a particular implementation may not use any spool at all without departing from the scope of the illustrative embodiments, as certain types of electrical cables may be wrapped or folded onto themselves without requiring a spool.

With reference to FIG. 3A, this figure depicts an exemplary configuration of multiple strands in a cable that may be used for implementing an illustrative embodiment. A strand in a cable is a electrically conducting wire in the cable. Cable 320 is shown to include six conducting strands 322 that are separated from each other using one or more electrically insulating layers 324 between the strands.

With reference to FIG. 3B, this figure depicts a second exemplary configuration of multiple strands in a cable that may be used for implementing an illustrative embodiment. Cable 340 is shown to include twenty four conducting strands that are separated from each other using one or more electrically insulating layers 344 between the strands. Strand 342 is one of the twenty four strands depicted in FIG. 3B.

In the exemplary depictions of FIGS. 3A and 3B, additional conducting strands that may be intended for grounding are not shown. Also not shown in FIGS. 3A and 3B are non-conducting strands that may be included in a cable for imparting mechanical strength, insulation, or for purposes other than carrying electrical signals such as transmit, receive and sidetone signals. Furthermore, the six and twenty four strand configurations are depicted only as exemplary. A particular implementation may use any multi-stranded cable that may be suitable for a particular electrical application, so long as the multi-stranded cable allows using an even number of strands for carrying the various signals. For example, a cable may contain an odd number of strands, but an implementation of the illustrative embodiments using that cable may use an even number of strands from that cable for testing sidetone signal levels.

Figure 4:
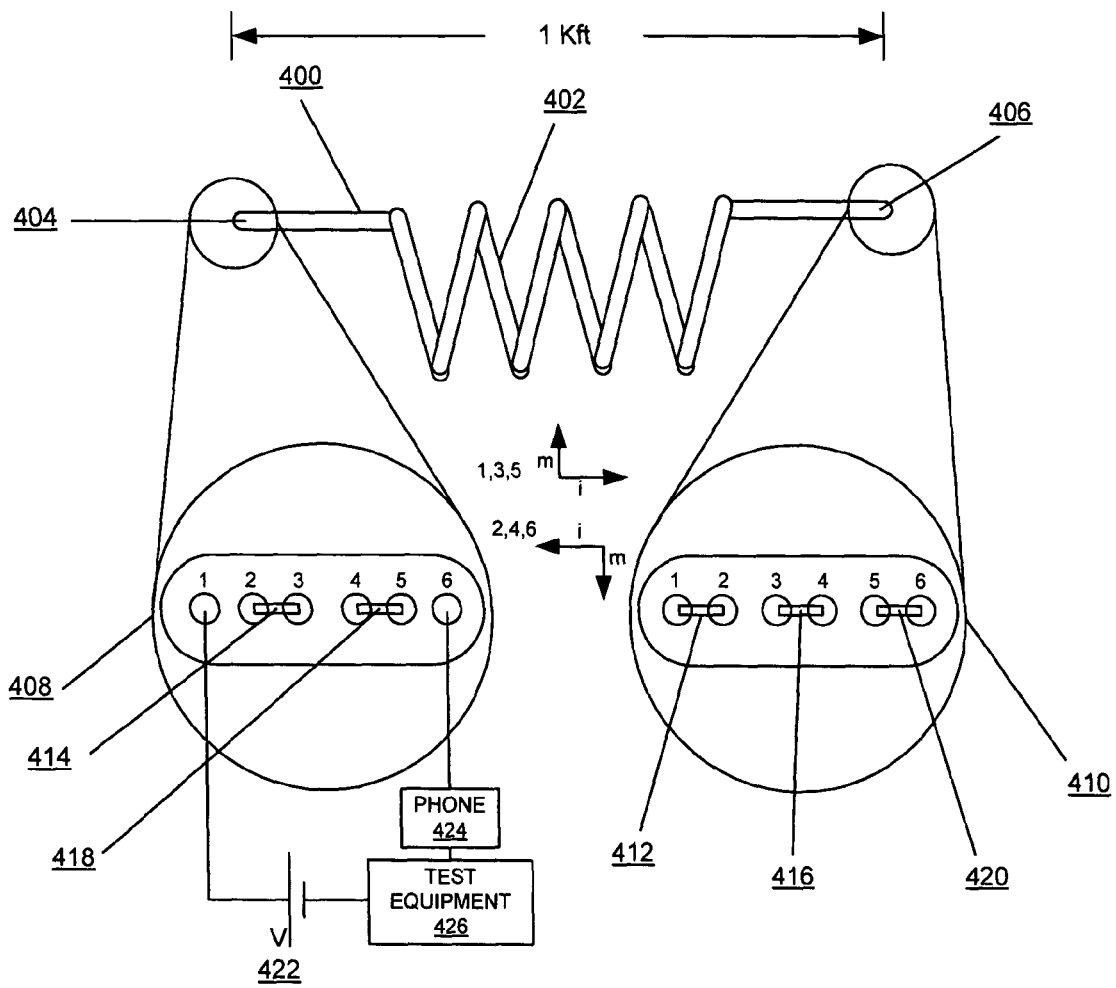
FIG. 4 depicts a configuration of a multi-stranded cable forming a real loop in accordance with an illustrative embodiment.

With reference to FIG. 4, this figure depicts a configuration of a multi-stranded cable forming a real loop in accordance with an illustrative embodiment. Cable 400 may be similar to cable 302 in FIG. 3. For the clarity of the description, cable 400 is exemplarily depicted to include six strands as in the configuration depicted in FIG. 3A.

Cable 400 when wound on a spool (not shown) becomes formed as coil 402. Note from the description above that a spool may not be needed at all if the cable can be wound onto itself. Cable 400 includes end 404 and end 406, which may be exposed from coil 402. Furthermore, the straight length of cable 400 thus wound with or without a spool is depicted to be 1 Kft. A length of 1 Kft has been chosen only as an example for simplifying the description of the illustrative embodiment. Any length of cable may be used without departing from the scope of the illustrative embodiments.

Cable 400, being of length 1 Kft, includes six strands of length 1 Kft each. Namely, strands 1-6, as shown in magnified view 408 of end 404 and magnified view 410 of end 406, are each a length 1 Kft from end 404 to end 406. Jumper 412 makes electrical connection between strands 1 and 2 at end 406. A jumper is a device that forms an electrically conductive path between two or more electrical conductors otherwise isolated from each other. A jumper can be formed using a piece of electrical wire to electrically join the two conductors, by simply twisting the two conductors together so that they form an electrical connection, or by using a preformed module that accepts the conductors into a preformed conducting pathway in the module.

Jumper 412 installed in the manner described above effectively yields a conductor of length 2 Kft within cable 400 of length 1 Kft because the total length of the conductor is now the length of conductor 1 from end 404 to end 406 plus the length of conductor 2 from end 406 to end 404. If a power source and a telephone device were electrically connected between conductors 1 and 2 at end 404 at this point in the configuration, the configuration would yield an actual loop of length 2 Kft, which would be a real loop formed of an actual 2 Kft length of electrical wire.

Installing jumper 414 to electrically connect conductors 2 and 3 at end 404 yields a conductor of length 3 Kft—1 Kft of conductor 1 plus 1 Kft of conductor 2 plus 1 Kft of conductor 3. If a power source and a telephone device were electrically connected between conductor 1 at end 404 and 3 at end 406 at this point in the configuration, the configuration would similarly yield a real loop of length 3 Kft formed of an actual 3 Kft length of electrical wire.

Installing jumper 416 to electrically connect conductors 3 and 4 at end 406 yields a conductor of length 4 Kft. Connecting a power source and a telephone device between conductors 1 and 4 at end 404 at this point in the configuration would similarly yield a real loop of length 4 Kft formed of an actual 4 Kft length of electrical wire.

Installing jumper 418 to electrically connect conductors 4 and 5 at end 404 yields a conductor of length 3 Kft. Connecting a power source and a telephone device between conductor 1 at end 404 and conductor 5 at end 406 at this point in the configuration would similarly yield a real loop of length 5 Kft formed of an actual 5 Kft length of electrical wire.

Installing jumper 420 to electrically connect conductors 5 and 6 at end 406 yields a conductor of length 6 Kft. Connecting a power source and a telephone device between conductors 1 and 6 at end 404 at this point in the configuration would similarly yield a real loop of length 6 Kft formed of an actual 6 Kft length of electrical wire. A loop of any length may be formed in a similar manner using a different length for cable 400, different number of strands in cable 400, or both. FIG. 4 depicts power source 422 and phone 424 connected in this manner to a real loop of length 6 Kft, formed using cable 400 of length 1 Kft in accordance with the illustrative embodiments.

Test equipment 426 may also be connected to the loop as shown for generating test signals, measuring test signals, or both. For example, phone 424 may receive a user's voice in a microphone included in phone 424 and convert that voice into an electrical signal. The electrical signal may travel through the real loop of 6 Kft formed using cable 400, and pass through test equipment 426. Test equipment 426 may include one or more pieces of equipment to attenuate the signal, measure the signal strength, or to perform other similar manipulations of the signal. The signal may then be received at a speaker in phone 424.

Other test equipment (not shown) may measure the performance of phone 424 for that sidetone signal. For example, a decibel meter may measure the audible level of the sidetone signal at the speaker of phone 424. Furthermore, the test setup as depicted in FIG. 4 may also include a notification mechanism that notifies the user about the various aspects of the sidetone signal strength. For example, an audible tone may sound, a lighted indication may be visible, a meter may show a deflection, or other suitable indications may notify the user that the sidetone signal is above a high threshold value, below a low threshold value, or between the high and low threshold values.

When an electrical conductor is wound into a coil as cable 400 is wound into coil 402, solenoid effect results. Solenoid effect is the generation of a magnetic field and increase of inductive impedance by passing electric current through a coil, such as coil 402. The direction of the magnetic field is perpendicular to the direction of the current through the coil.

Coil 402 is made from cable 400 including six strands. If electric current flows from end 404 of strand 1 to end 404 of strand 6, the direction of the current in three strands will be opposite of the direction of the current in the other three strands. In this exemplary current flow, current direction in strands 1, 3, and 5 will be from end 404 to 406, whereas the current direction in strands 2, 4, and 6 will be from end 406 to end 404. The opposite direction of current in an equal number of strands in coil 402 effectively nullifies the magnetic field generated by solenoid effect. The overall inductance of coil 402 is also nullified for the same reason.

Thus, even though wound as a coil, the loop of 6 Kft length formed as described above behaves as a loop of 6 Kft length formed from straight wire, as may be the case in the actual telephone network Therefore, the real loop in FIG. 4 may provide a closer approximation of the actual loop in a telephone network, as compared to the simulation depicted in FIG. 2.

In one embodiment, a cable may include an odd number of wires and the illustrative embodiments may be implemented using an even number of wires from those wires. In another embodiment, a cable may include wires of different electrical characteristics such as resistance, current carrying capacity, and inductance. Electrical characteristics of two wires can differ for a variety of reasons; for example, the wires may be of different thicknesses, cross-sections, material compositions, physical construction, and manner of coiling, resulting in differing electrical characteristics.

Electrical characteristics of a wire can also vary depending on the properties of the electrical insulation used with the wire. For example, a wire separated from another wire by one type of insulation may allow a certain voltage difference to exist between the two wires. The same two wires may allow a higher or lower voltage difference than the one before when separate by another type of insulation.

These examples of electrical characteristics and factors affecting them are not exhaustive. Many other electrical considerations will become apparent from this disclosure. For example, capacitance between a pair of wires can change by simply changing the distance between the two wires, or by changing the insulation between the two wires.

A set of even numbered wires may be chosen from the cable for making the loop in the manner described with respect to FIG. 4. If in that set, pairs of wires have similar characteristics, such as position in the cable, size, and insulation, the overall loop may represent an actual loop existing between a telephone and a CO in a telephone network more closely than if they do not. For example, the inductance of a coil of wire of one characteristic more closely nullifies the inductance of a similar coil of similar wire carrying similar current in opposite directions as compared to when either the characteristics of the coil, the wire, the current, or any combination thereof, are dissimilar. Therefore, the overall impedance of the loop may approximate the impedance of the actual loop more closely when wires of similar characteristics are paired together in forming the loop as described above.

Figure 5:
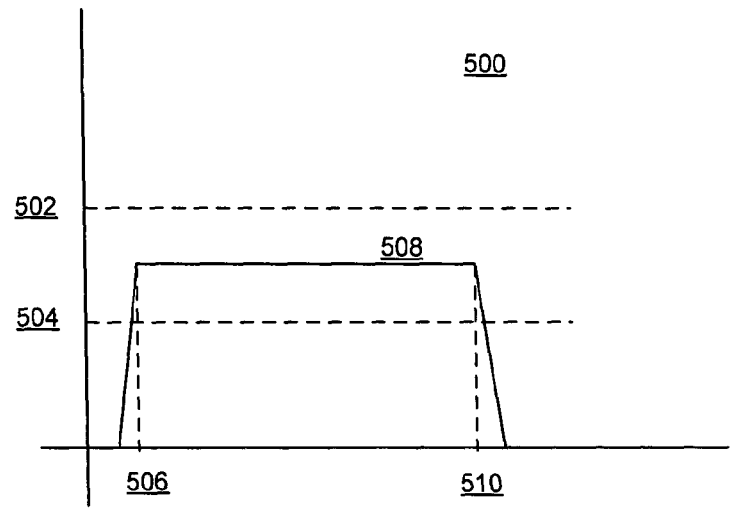
FIG. 5 depicts a graph of a sidetone signal level in accordance with an illustrative embodiment.

With reference to FIG. 5, this figure depicts a graph of a sidetone signal level in accordance with an illustrative embodiment. Graph 500 may be generated by a test equipment, or by using the sidetone signal strength data generated by a test equipment, such as test equipment 426 in FIG. 4.

Graph 500 depicts high value 502 and low value 504 on the Y-axis, which are high sidetone signal strength threshold and low sidetone signal strength threshold respectively. A desirable sidetone signal strength may be between high value 502 and low value 504. Graph 500 further shows that at start of test 506, strength 508 of a test sidetone signal rises to a level between high value 502 and low value 504. Strength 508 remains substantially steady between high value 502 and low value 504 during the test period, and drops to a substantially zero level after end of test 510.

Thus, the illustrative embodiments describe a method and apparatus for forming and using a real loop for sidetone measurement. The illustrative embodiments have been described with respect to sidetone measurement as one exemplary application where the real loop may be used. Other implementations may apply the illustrative embodiments to other applications that have a need for long lengths of wire in a compact space from this disclosure. The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for testing sidetone signal strength, the method comprising:
   providing a loop modeled from a single coil of cable and representing a straight wire electrical loop existing between a telephone and a central office in a telephone network, comprising:
      a plurality of conducting wires in a single cable having a first length, which first length is greater than or equal to 1000 feet, wherein the cable is configured in a single coil wound in a single direction and having a first end and a second end exposed for electrical connections to an even number of wires therein, wherein each wire in the even number of wires is capable of being identified as being the same wire on each of the first and second ends of the cable, and wherein at least one pair of physically adjacent wires comprising at least a first wire and a second wire in the even number of wires are electrically connected to form an electrical loop including the at least one pair of physically adjacent wires, wherein the first wire has a first insulation type and the second wire has a second insulation type, and wherein the first insulation type imparts at least one electrical characteristic to the first wire which is materially different than a corresponding electrical characteristic imparted by the second insulation type to the second wire, wherein a length of the electrical loop is at least twice the first length of the cable, wherein fewer than all of the plurality of conducting wires in the cable are electrically connected to form an electrical loop and wherein an impedance of the loop is representative of an impedance of an electrical loop existing between a telephone and a central office in a telephone network;
   coupling a communication device capable of producing a signal including a sidetone signal to the loop;
   providing the signal in the loop; and
   measuring a strength of the sidetone signal at the communication device to form a measured sidetone strength.

2. The method of claim 1, wherein the strength of the sidetone signal determines a performance characteristic of the communication device.

3. The method of claim 1, wherein the electrical characteristic includes at least one of a resistance, a current carrying capacity, and an inductance of the first and second wires p.

4. The method of claim 1, further comprising:
   determining that the measured sidetone strength is between a high level and a low level.

5. The method of claim 4, further comprising:
   generating an indication of the measured sidetone level being between the high level and the low level.

6. A system for testing sidetone signal strength, the system comprising:
   a loop modeled from a single coil of cable and representing a straight wire electrical loop existing between a telephone and a central office in a telephone network, comprising:
      a plurality of conducting wires in a single cable having a first length, which first length is greater than or equal to 1000 feet, wherein the is cable configured in a single coil wound in a single direction and having a first end and a second end exposed for electrical connections to an even number of wires therein, wherein each wire in the even number of wires is capable of being identified as being the same wire on each of the first and second ends of the cable, and wherein at least one pair of physically adjacent wires comprising at least a first wire and a second wire in the even number of wires are electrically connected to form an electrical loop including the at least one pair of physically adjacent wires, wherein the first wire has a first insulation type and the second wire has a second insulation type, and wherein the first insulation type imparts at least one electrical characteristic to the first wire which is materially different than a corresponding electrical characteristic imparted by the second insulation type to the second wire, wherein a length of the electrical loop is at least twice the first length of the cable, wherein fewer than all of the plurality of conducting wires in the cable are electrically connected to form an electrical loop and wherein an impedance of the loop is representative of an impedance of an electrical loop existing between a telephone and a central office in a telephone network;
   a communication device capable of generating a signal including a sidetone signal coupled to the loop, a strength of the sidetone signal received at the communication device through the loop representing a strength of the sidetone signal received at the communication device when the communication device is coupled to the telephone network; and
   a test equipment in communication with the loop and the communication device configured to test the strength of the sidetone signal received at the communication device through the loop.

7. The system of claim 6, wherein the strength of the sidetone signal determines a performance characteristic of the communication device.

8. The system of claim 6, wherein the electrical characteristic includes at least one of a resistance, a current carrying capacity, and an inductance of the first and second wires.

* * * * *